United States Patent
Saraya et al.

(10) Patent No.: US 10,795,532 B1
(45) Date of Patent: Oct. 6, 2020

(54) INTERACTIVE GRAPHICAL USER INTERFACE THUMBNAIL

(71) Applicant: International Business Machines Corporation, Armonk, NY (US)

(72) Inventors: Siddharth K. Saraya, Raniganj (IN); Ravi Kumar Reddy Kanamatareddy, Punjagutta Colony (IN)

(73) Assignee: International Business Machines Corporation, Armonk, NY (US)

( * ) Notice: Subject to any disclaimer, the term of this patent is extended or adjusted under 35 U.S.C. 154(b) by 15 days.

(21) Appl. No.: 16/352,943

(22) Filed: Mar. 14, 2019

(51) Int. Cl.
*G06F 3/0481* (2013.01)
*G06F 3/0482* (2013.01)

(52) U.S. Cl.
CPC .......... *G06F 3/0481* (2013.01); *G06F 3/0482* (2013.01)

(58) Field of Classification Search
CPC ............................... G06F 16/10; G06F 3/0481
See application file for complete search history.

(56) References Cited

U.S. PATENT DOCUMENTS

| | | | |
|---|---|---|---|
| 7,673,255 B2 | 3/2010 | Schechter et al. | |
| 8,381,131 B1 | 2/2013 | Rosner | |
| 8,656,300 B2 | 2/2014 | Matthews et al. | |
| 8,819,585 B2 | 8/2014 | Sareen et al. | |
| 2008/0028292 A1* | 1/2008 | Graham | G06F 16/9577 715/230 |
| 2016/0077709 A1 | 3/2016 | Doan et al. | |
| 2016/0299905 A1* | 10/2016 | Geyer | G06F 40/134 |

FOREIGN PATENT DOCUMENTS

EP       2474901 B1    5/2017

* cited by examiner

*Primary Examiner* — Rayeez R Chowdhury
(74) *Attorney, Agent, or Firm* — Nolan M. Lawrence (57) ABSTRACT

A first interaction indication is intercepted from a user interface to interact with a first portion of the user interface. The user interface currently displaying a thumbnail representative of an application window. It is determined from the user interface that the first interaction indication is directed towards the thumbnail representative of the application window. Transmission of the first interaction indication to the use interface is canceled. A thumbnail position of the first interaction indication is calculated. The calculation is based on a position of the first interaction indication before cancelation. The calculated thumbnail position of the first interaction indication is translated to an application position of the application window. A second interaction indication is generated. The second interaction indication is directed towards the application position of the application window. The second interaction indication is transmitted to the user interface such that the user interface directly interacts with the application window.

20 Claims, 4 Drawing Sheets

INTERACTIVE GRAPHICAL USER INTERFACE THUMBNAIL

BACKGROUND

The present disclosure relates to graphical user interfaces, and more specifically, to graphical user interface thumbnails directly manipulating non-thumbnail graphical user interface elements.

Graphical user interfaces (GUIs) may be used in industrial uses to provide workers with a method to input information into a computer and visualize information stored in the computer. GUIs may be used in healthcare to record, manipulate, and understand information related to providing healthcare service to people. A GUI may be used in leisure time to navigate around and interact with digital media content, such as photographs, and electronic documents.

SUMMARY

According to embodiments of the present disclosure, disclosed is a method, system, and computer program product. A first interaction indication is intercepted from a user interface to interact with a first portion of the user interface. The user interface is currently displaying a thumbnail representative of an application window. It is determined from the user interface that the first interaction indication is directed towards the thumbnail representative of the application window. Transmission of the first interaction indication to the use interface is canceled. A thumbnail position of the first interaction indication is calculated. The calculation is based on a position of the first interaction indication before cancelation. The calculated thumbnail position of the first interaction indication is translated to an application position of the application window. A second interaction indication is generated. The second interaction indication is directed towards the application position of the application window. The second interaction indication is transmitted to the user interface such that the user interface directly interacts with the application window.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to graphical user interfaces; more particular aspects relate to graphical user interface thumbnails directly manipulating non-thumbnail graphical user interface elements. While the present disclosure is not necessarily limited to such applications, various aspects of the disclosure may be appreciated through a discussion of various examples using this context.

Computers have become ubiquitous tools for performing work across many fields. Users increasingly perform most of their work on a computer (e.g., a tablet, a desktop computer, a laptop). In computer design and operation, a graphical user interface has become one of the most pervasive and often used forms of interaction in the computer field. In some instances, graphical user interfaces (GUIs) operate through direct manipulation (e.g., a touchscreen that enables finger-based touches and gestures for manipulating GUI elements directly). In some instances, GUIs operate through indirect manipulation (e.g., a mouse moved by a user corresponds to a cursor being moved on a screen, the cursor consequently interacts with and manipulates GUI elements). In some instances, GUIs operate through a combination of direct and indirect manipulation (e.g., a mouse cursor moved through a touchpad in combination with a touchscreen of a laptop).

GUIs face a multitude of technical challenges. In some instances, a GUI must operate with limited screen real estate. Real estate includes the amount of screen points or pixels for the display of applications and each application may take up tens or hundreds of points of real estate in both the vertical and horizontal direction. For example, a smart phone or laptop has a limited amount of screen real estate, which limits the amount of information that may be displayed on screen at any one time. In some instances, GUIs may make it difficult to provide users with consistency or intrusiveness while increasing the information density. For example, a desktop computer concurrently executes tens of programs though a desktop monitor and is only capable of displaying three or four applications concurrently and providing meaningful real estate for application interaction. In some instances, a GUI is forced to provide for a compromise between providing users with a variety of visual impairments and able-vision users with a useful interface. For example, the use of one or more visual identifiers (e.g., shading, shadow, color) communicate to able-vision users the state of a window corresponding to an application. Continuing the example, the user interface size must be large enough for visually-impaired users to comprehend and see the one or more visual identifiers.

In some instances, the use of thumbnails may provide for communicating some information regarding windows to a user in a GUI. A thumbnail (thumb) may be a small representation of an application window (window) that depicts the current state of the window. Thumbnails, however, have certain drawbacks. For example, thumbnails are static pictures that, in response to user interaction, change focus to the application window that corresponds to the thumbnail. Continuing the example, because the thumb depicts the current state of the window, a user may mistakenly believe that interaction with the thumb corresponds to interaction with the window. Further continuing the example, the user may be confused because not only does focus change away from their current task to the window corresponding to the thumb, the user interaction they erroneously believed would affect the intended window is not carried out.

In some circumstances, a further challenge is providing interaction with thumbnails requires that custom user interface elements need to be built. These custom user interfaces (widgets) require specific programming and are implemented on a per-application basis. In a first example, a widget could be built into a task-switching interface (e.g., a task bar, a task switcher) that includes buttons or sliders for the manipulation of a media player. Continuing the first example, the media-player widget requires programming and testing of the task-switching interface to ensure proper interaction and behavior. Further continuing the first example, the media-player widget buttons are specific to the media player application and cannot be used by other applications.

In a second example, a calculator application utilizes a calculator thumbnail widget, which replaces the thumbnail's static picture of the calculator with a small dedicated widget window. The dedicated widget window requires the developer to design and build an interface that operates within the small scale of a widget. In addition to the development overhead, there is increased system usage as the results of calculations by the thumbnail being passed through to the calculator application for consistency (e.g., more message passing API or entirely new message passing API development between the thumbnail widget and the application). Finalizing the second example, users may come to understand and rely on the interaction model of the calculator thumbnail widget but may be confused or disoriented when other applications have static image thumbnails that provide only focus change but not direct thumbnail interaction.

A context consistent direct window manipulation (CCDWM) interface may provide for enhancements over existing GUIs. CCDWM may provide a technical solution for understanding user input in a GUI that includes static thumbnails and application windows. CCDWM may provide for a GUI that simplifies user input and permits a user to interact with a variety of applications windows consistently. CCDWM may enable users to interact with a GUI that includes slight larger and more visually clear user interface elements, while providing for more complex interactions (e.g., thus permitting users with visual impairments to successfully interact with an information-dense user interface). The CCDWM may leverage existing operating system APIs such that the new application interactions operate consistently in a variety of installations (e.g., a portable computer running a first type of operating system with a touchscreen input device, or a desktop computer running a second type of operating system with mouse and keyboard input devices). CCDWM may permit for more complex device interaction (e.g., manipulation of multiple windows and thumbnails) with limited screen real estate devices (e.g., a tablet, or handheld computer with a physically small screen).

CCDWM may provide for thumbnail interaction that directly manipulates the application windows that are associated with the thumbnails. This thumbnail interaction may permit the user to operate without changing the focus of any active windows, or without directly interacting with a thumbnail. CCDWM may operate at the operating system, kernel, or driver level which provides consistent interaction with a variety of applications without requiring developers to write custom thumbnail functionality for every potential application. By handling user interactions outside of a specification application or thumbnail, CCDWM may be future proof as new applications with new interfaces are introduced. Further, user confusion may be reduced as every application window may be interacted with consistently.

CCDWM may utilize static images, which reduces the need for multiple widgets, multiple APIs, and/or messaging techniques to be developed, tested, iterated upon, and validated. Reliance on static images may increase performance as fewer routines are needed on a per application basis (e.g., only loading at runtime a single API or driver instead of a plurality, leveraging existing static image-based thumbnails). Reliance on a unified interaction model also provides for fewer errors, as a singular interaction scheme can be developed, tested, and deployed. For example, each custom widget or interface element may have its own code and API along with exception handling. Continuing the example, when multiple custom widgets are developed and implemented, each widget needs creation and testing with the underlying operating system and GUI. Further continuing the example, not only does each widget need to be created and tested individually, but in combination (e.g., testing to ensure that any API or exception handling of a first widget does not interfere with any another widget's API or exception handling).

Figure 1:
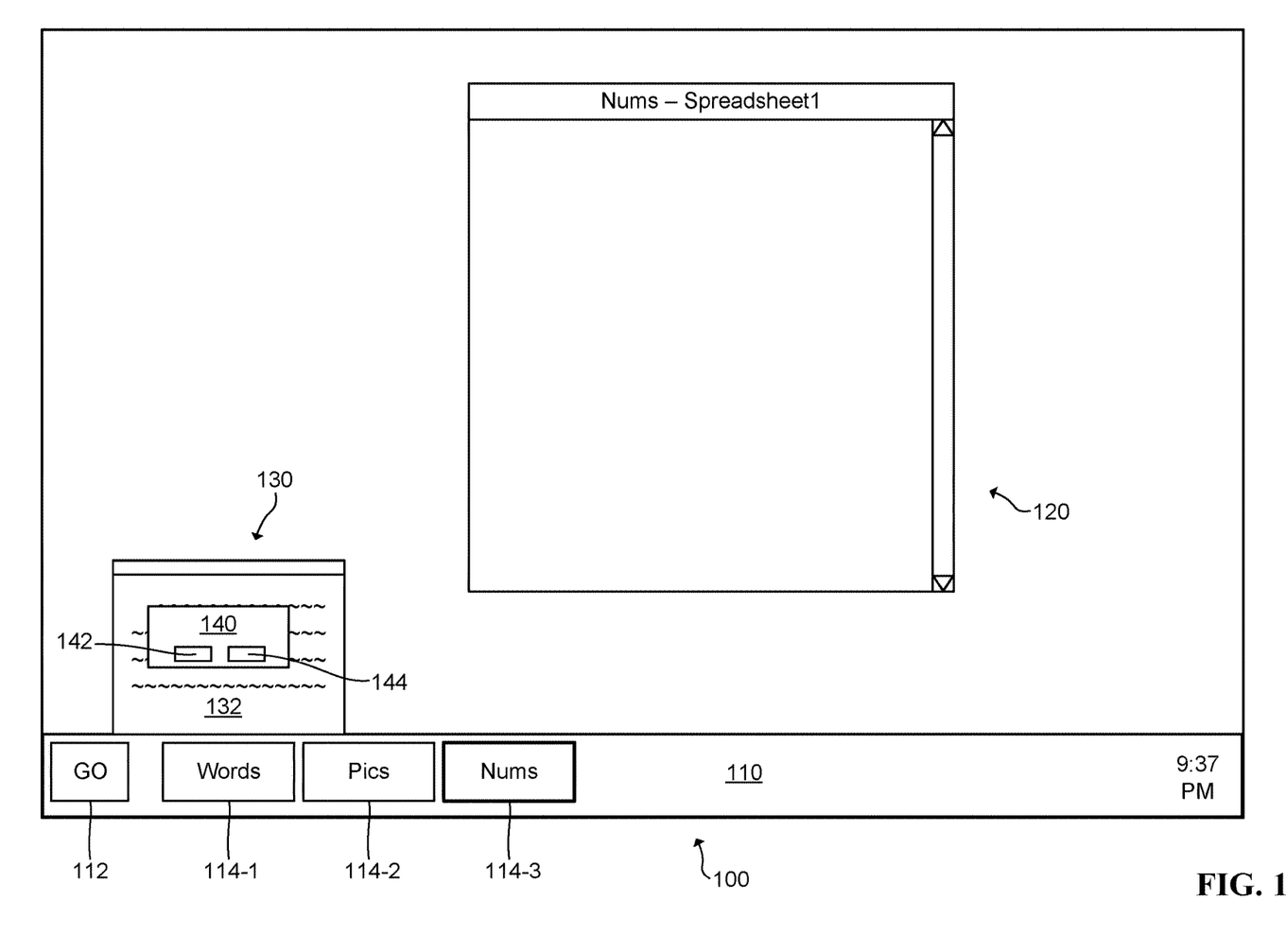
FIG. 1 depicts an example user interface to provide direct application manipulation, consistent with some embodiments of the disclosure.
Figure 4:
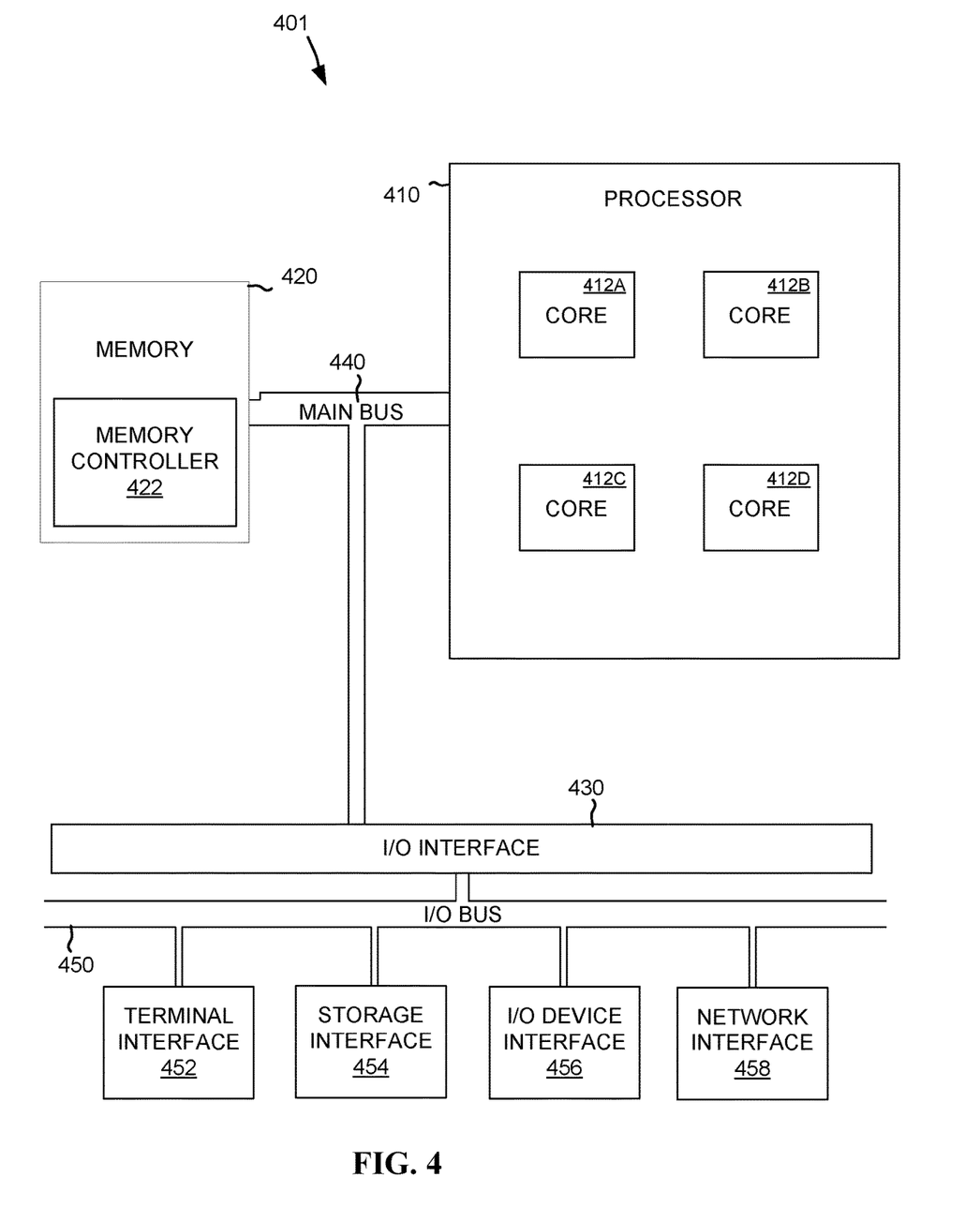
FIG. 4 depicts the representative major components of an example computer system that may be used, in accordance with embodiments of the present disclosure.

FIG. 1 depicts an example user interface 100 to provide direct application manipulation, consistent with some embodiments of the disclosure. The user interface 100 executes on a computer (not depicted) having an input mechanism and a display to enable context consistent direct window manipulation (CCDWM). The computer may be a computing device with a direct manipulation graphical user interface (GUI) (e.g., a tablet computer with a touchscreen for accepting of touch input). The computer may be a computing device with an indirect manipulation GUI (e.g., a desktop computer with a mouse and keyboard). The computer may be a computing device with a combination of direct and indirect manipulation GUIs (e.g., a touchscreen laptop with a trackpad for manipulation of a cursor). FIG. 4 depicts an example computer system 401 that may be configured to execute some embodiments of the disclosure.

The GUI 100 may include any or all of the following: a task element 110, a task-initiation element 112, a plurality of application-representation elements 114-1, 114-2, 114-3 (collectively, 114), a visible application window 120, and a thumbnail 130. The task element 110 is a user interface element (e.g., a taskbar, a task switcher, an application selector) that lists one or more applications that are running along with other status elements (e.g., the time, active utilities). The task-initiation element 112 is a user interface element (e.g., a button, a menu, a link) that is configured to provide a list of additional programs and files that a user may interact with. The task-initiation element 112 is shown as represented by the word "GO" but may be represented by letters, characters, pictures, or some combination.

The application-representation elements 114 are user interface elements (e.g., buttons, shortcuts, links) that correspond to applications that are running or can be run upon receiving a user interaction indication (user interaction). The application-representation elements 114 are arranged within the task element 110. The application-representation elements 114 are shown as represented by words (e.g., 114-1 "Words", 114-2 "Pics", 114-3 "Nums") but may be represented by letters, characters, pictures, or some combination. The graphical user interface 100 is configured to currently display an application window 120 currently visible and corresponding to the application "Nums." The task element 110 may be configured to highlight, enhance, or otherwise emphasize one or more of the other elements of the GUI 100. For example, GUI task element 110 depicts application-representation 114-3 with an enhanced border to communicate that the window with current focus is application window 120.

The graphical user interface 100 is configured to accept interaction indications (input) from a user (e.g., a mouse cursor position, a mouse-button click, a touch from one or more fingers, a swipe from one or more fingers, a keyboard key press). The GUI 100 may also be configured to accept multiple interaction indications simultaneously (e.g., a mouse-button click from the right hand of a user while the user holds a key press of a keyboard with the left hand of the user). In response to receiving an input from the GUI 100, the computer provides interactions. The interaction may be the manipulation of content, such as inputting cells into a spreadsheet of the Nums application window 120. The interaction may be a task switch, such as the display of a second window (not depicted) related to a textual document of the Words application.

The interaction may be the communication to a user of an application that is not currently in focus or displayed (e.g., minimized, off-screen), such as an application preview or application previewing. For example, in application previewing, the user moves a mouse across a mousepad, and the mouse cursor responsively moves over the Pics application-representation 114-2. Continuing the example, the GUI 100 displays a Pics thumbnail (not depicted), the thumbnail depicts a non-interactive image that shows the content of the Pics application window (not depicted). Further continuing the example, the user causes the cursor to move from the Pics application-representation 114-2 to, on, or over the Pics thumbnail—responsively the GUI 100 renders a preview (not depicted) of the Pics application window. Further continuing the example, the GUI 100 stops displaying the preview of the Pics application responsive to if the user causing the cursor to move off the Pics thumbnail (e.g., over a portion of the GUI other than the Pics thumbnail).

The thumbnail 130 of the user interface 100 displays a representation of the Words application (not depicted). The thumbnail 130 depicts a main-window rendering 132 of text and a second-window rendering 140, corresponding to the state of the window of the Words application which has an open textual document. The second-window rendering 140 includes a first-button rendering 142 and a second-button rendering 144. The thumbnail 130 is a rendering or two-dimensional representation of the Words application (not depicted) such that any interaction indication (e.g., a mouse click, a finger touch/gesture) cannot directly manipulate the content of the Words application representation. The operating system that renders the GUI 100 may periodically update the application windows including the Words application window and also any thumbnails including thumbnail 130. For example, if content of the Words application window changes, then the operating system updates the content within thumbnail 130 to correspond to the updated Words application. In some configurations, a computer has a default behavior to context-switch upon receiving an interaction indication. For example, upon a user clicking a mouse while directing a mouse cursor over a thumbnail, the computing device responsively switches the active window to the application window corresponding to the clicked thumbnail. This switch may occur even though another application is currently in focus. This context switch may break a user's concentration, interrupt, slow, or even confuse a user. The user then would need to switch back to the previous application and reorient themselves.

The user interface 100 may be configured to provide direct application window manipulation through an implementation of the CCDWM. The implementation may be through an operating system extension or subsystem of the kernel of an operating system that provides the GUI 100. The implementation may be through a rendering component of the GUI 100, such as a compilation and compositing layer that logically positions and renders the GUI, including task-switching elements, windows, and thumbnails. The implementation may be a device driver (e.g., mouse driver), third-party utility (e.g., mouse configuration application), or some combination.

In some embodiments, the default behavior of the user interface 100 is modified using techniques and implementations of the CCDWM. For example, GUI 100 is configured by default to display thumbnail 130 in response to receiving an interaction indication (e.g., a mouse cursor being placed over application representation 114-1). The GUI 100 is configured by default to switch focus to the Words application (not depicted) upon receiving a second interaction indication (e.g., mouse click on the thumbnail 130) and is not configured by default to provide the second interaction to the Words application. The position of the mouse cursor within the thumbnail 130 is calculated by the CCDWM (e.g., device driver) and translated into a position of the Words application window (not depicted). The CCDWM intercepts and cancels the second interaction indication (e.g., mouse click on the thumbnail 130). Finalizing this example, the CCDWM translates the mouse click on the thumbnail 130 into a position within the thumbnail, generates an equivalent third interaction indication (e.g., a new mouse click), and provides the new mouse click to the translated position of the Words application window.

Consequently, a GUI, such as GUI 100 that utilizes CCDWM, maintains the application context that it previously had. Moreover, faster operation of the computing device is achieved, such as allowing a user to directly interact with a minimized window via calculating the relative positional click within thumbnails and generating application interaction with the minimized window. In this way a user can alter content of a hidden window of an active application while maintaining the set of windows that are currently visible. For example, window 120 corresponding to the Nums application is visible. A user clicks on a portion of thumbnail 130 that corresponds to second-window rendering 140; specifically, the portion of the rendered image of the thumbnail that depicts first-button rendering 142. The relative position of the cursor over thumbnail 130 that corresponds to first-button rendering 142 is determined by sampling the position of the cursor at the time of the click. The computer translates this click into the position on the Words application window (not depicted). The computer generates a new click and provides this to the GUI 100 such that the button within the Words application window (corresponding to first-button rendering 142 of thumbnail 130) is clicked. The second window (not depicted) in the Words application window (corresponding to second-window rendering 140 of thumbnail 130) is closed in response to the new click. Thumbnail 130 receives from GUI 100 an updated status of the Words application window without a second window. Finalizing this example, the newly updated thumbnail (not depicted) displays a main-window rendering without second-window rendering, and the Nums application window 120 is still the current active window.

The operation of CCDWM may be set through a third-party application (e.g., mouse utility) or an operating system setting. The operation of CCDWM may be a default operation in response to clicking a mouse while a mouse cursor is over a thumbnail. In some embodiments, the operation of CCDWM only happens when a user holds a keyboard key in combination with clicking a mouse while the mouse cursor is over a thumbnail (e.g., hold the keyboard shift key and left mouse button click on a portion of a thumbnail). The operation of CCDWM may also be set by a user. For example, a preference pane may permit a user to select which applications, windows, or all applications/windows should be directly manipulatable by CCDWM. Continuing the example, a user states that only a file-browsing application should receive CCDWM input. Further continuing the example, clicking in a GUI while position a mouse cursor over a thumbnail for a photo-manipulation application would change focus to display the photo-manipulation application, and clicking over a thumbnail for the file-browsing application would not change focus but would calculate relative position to be passed directly as a second click in the file-browsing application window. In some embodiments, the operations of CCDWM may be implemented to work with window previewing.

Figure 2A:
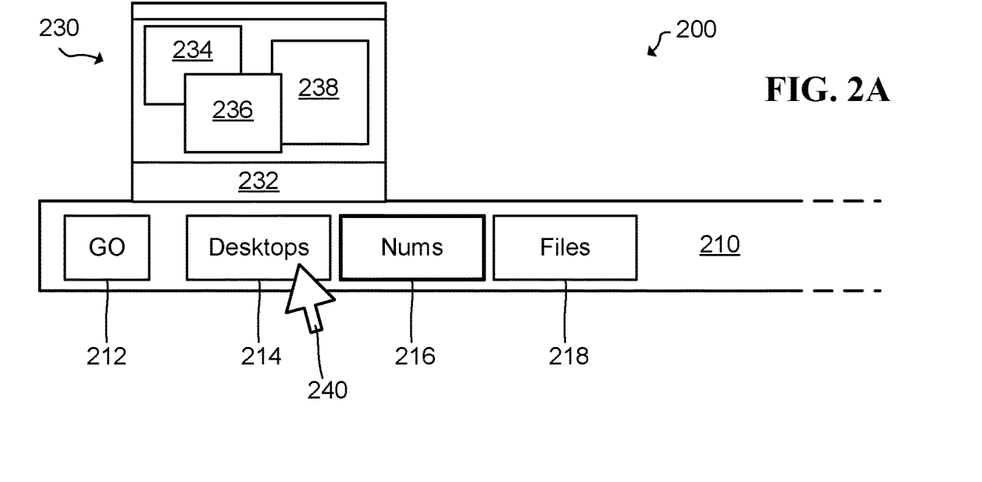
FIG. 2A depicts a portion of an example graphical user interface at a first time, consistent with some embodiments of the disclosure.
Figure 2B:
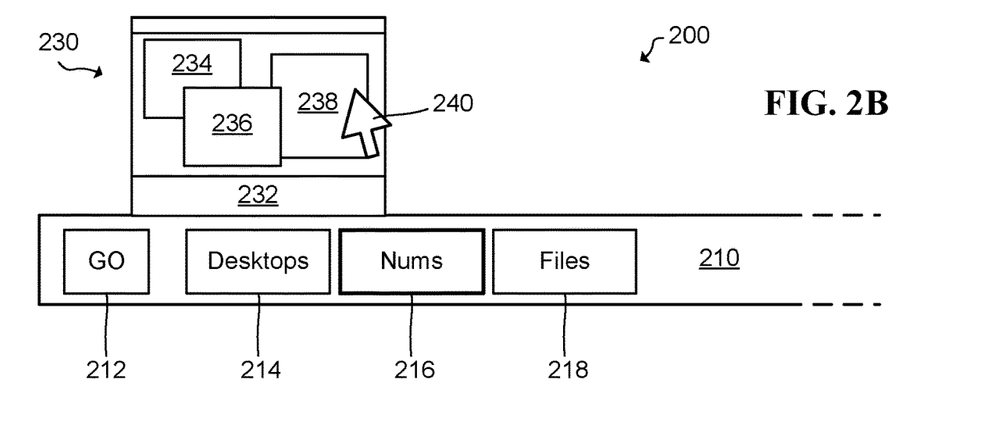
FIG. 2B depicts a portion of an example graphical user interface at a second time, consistent with some embodiments of the disclosure.
Figure 2C:
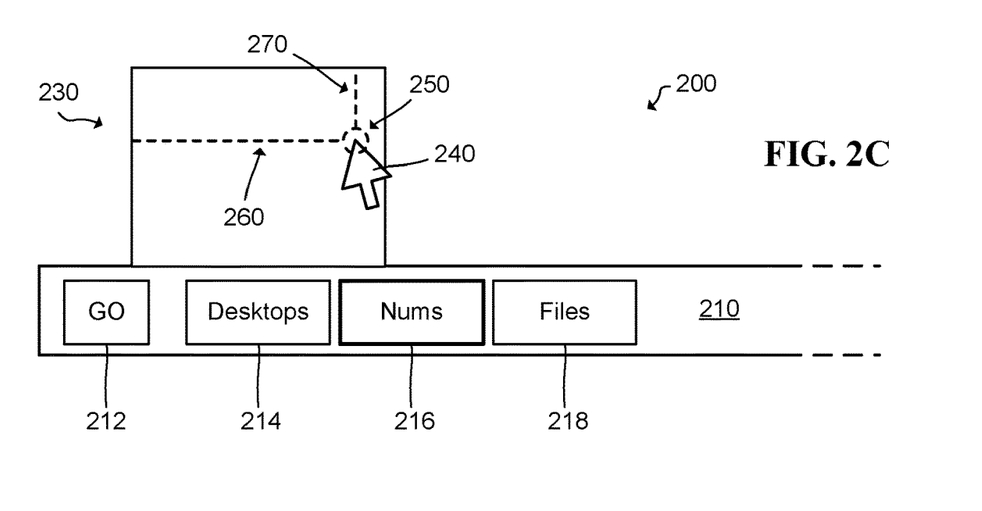
FIG. 2C depicts an interaction scheme for a portion of an example graphical user interface at a third time, consistent with some embodiments of the disclosure.

FIGS. 2A, 2B, and 2C depict a portion of an example graphical user interface 200, consistent with some embodiments of the disclosure. The graphical user interface (GUI) 200 implements techniques of the disclosure such as a context consistent direct window manipulation (CCDWM). Graphical user interface 200 may be operating on a computer system such as a tablet computer or a desktop computer. FIG. 4 depicts an example computer system 401 that may be configured to host an operating system including GUI 200. GUI 200 includes the following elements: an active task selector 210: a set of shortcuts 212, 214, 216, and 218, a thumbnail 230 that depicts content of a first application window, and a cursor 240. The active task selector 210 is a user interface element of GUI 200 that permits a user to select between active tasks or applications, and to launch applications. Active task selector 210 may emphasize or visually communicate that one or more of the applications has focus for receiving input from a user (e.g., shortcut 216 is currently active).

Shortcut 212 corresponds to a menu or other interface for selecting and launching additional programs. Shortcuts 214, 216, and 218 correspond to a plurality of currently running applications including a "Desktops" application (not depicted), a Nums application (not depicted), and a Files application (not depicted), respectively. Though not depicted, the entirety of GUI 200 includes the rendering of an active window for conveying a Nums application corresponding to shortcut 216. Shortcut 214 is a link to, and Thumbnail 230 depicts content corresponding to, a first window of the Desktops application (not depicted). The Desktops application is a remote desktop software client that enables a user to view and manipulate a second graphical user interface (server GUI) of a second computer. Implementation of CCDWM in FIGS. 2A, 2B, and 2C may be through a third-party application, such as remote desktop software.

In detail, remote desktop software may include one or more application programming interfaces (APIs, alternatively interfaces) and may take the form of a software stack. The interfaces may include a plurality of libraries and runtimes both on the computer that hosts the desktop (the server) and on the computer that remotely connects to the desktop of the server (the client). Certain interfaces receive input from the client computer's input devices (e.g., mouse, keyboard, touchscreen) and translate the input to secondary input to be directly provided to the server computer. Likewise, certain interfaces translate output from the server (e.g., output capable of being displayed on a first monitor locally attached to the server) to an output device (e.g., a display window of a second monitor) for the client. The software stack installed in the client and the server may emulate input devices consistently such that they are processed on the server the same as any local input device. Likewise, the software stack installed on the client may permit output to a remote desktop software application (e.g., the Desktops application window of FIGS. 2A, 2B, and 2C) and the server may emulate output devices consistently such that they are provided to the client and the server in the same manner as a local output device.

The software stack may include data interaction that permits operation through a plurality of functions. The software stack may include any of the following that allows for remote desktop clients and local input devices to function consistently regardless of being local or being remote. Data interaction of the server GUI utilizing messages and actions. Multiuser collaboration of calendar sharing and filing sharing. Desktop management include style, object, window, and session management. A GUI engine allows for construction of the server GUI: output to a shell, one or more widget-like applications, and various other toolkits. Integration may take the form of a plurality of technologies, including method invocation, data typing, application messaging, and process execution. Functions operate using the stack, such as message passing between applications, message passing between the operating system and specific applications. The implementation of the interfaces may be in the form of a socket-based control mechanism or daemon for sub process control. Analogously, the interfaces form the private classes of the remote desktop software and actions provided by the client form the public classes. The actions may be in the form of attributes in a type attribute list that describes how that operations may be made available. Execution strings may be generated to be passed to the server in like manner. Remote desktop software interfaces permit a client to target an active desktop, to translate a pointer location, and focus on processes within an application window of the client. The variables, functions, classes, and other interfaces of remote desktop software may also be embedded with a network connection utilizing common networking protocol (e.g., TCP packets, UDP packets).

In the context of FIGS. 2A, 2B, and 2C, a remote desktop application included as part of the "Desktops" application (not depicted) may be rendered in a first window (not depicted) of GUI 200. The first window utilizes the remote desktop software interfaces to provide sub-process access and control mechanisms, to start, manage, and collect results from applications running on the server. For example, launching a data warehouse application on the server and viewing the content of a server window conveying the data warehouse application of a server GUI in the first window (not depicted) of GUI 200.

FIG. 2A depicts a portion of an example graphical user interface 200 at a first time, consistent with some embodiments of the disclosure. Cursor 240 represents a mouse cursor running on a computer that renders GUI 200. Rendering may include hosting, generating, or otherwise creating a depiction of the applications, operating system, and desktop software. Cursor 240 moves responsively to a user moving an input device (e.g., mouse, trackpad, touchpad). In FIG. 2A the cursor 240 is moved over shortcut 214 corresponding to the remote desktop application (not depicted). Responsively to movement of the cursor 240, GUI 200 renders an image—thumbnail 230. Thumbnail 230 is an image that corresponds to the current state of a first window (not depicted) of the "Desktops" client. The Desktops client is remote desktop software executing on the computer that renders GUI 200. The first window (not depicted) conveys a representation of a server GUI, including: a server task switcher, and three server application windows corresponding to three server applications on a server. Correspondingly, thumbnail 230 displays a task switcher representation 232, and three application representations 234, 236, and 238.

FIG. 2B depicts a portion of an example graphical user interface 200 at a second time, consistent with some embodiments of the disclosure. The second time shown in FIG. 2B represents the GUI 200 after the first time depicted in FIG. 2A (i.e., the time at which the cursor 240 was over shortcut 214, with thumbnail 230 depicting an image representing the "Desktop" client rendered in the GUI 200). At the second time the cursor 240 is placed over the thumbnail 230 responsive to a user moving a mouse.

FIG. 2C depicts an interaction scheme for a portion of an example graphical user interface 200 at a third time, consistent with some embodiments of the disclosure. The third time represents a time after the second time but when further interaction indications are received by the computer rendering the GUI 200 (e.g., a mouse click is received from a hardware mouse). The position 250 of the cursor 240 is tracked by the computer, and FIG. 2C depicts this tracked interaction indication. The position 250 of the cursor 240 may be tracked constantly, such as regardless of where the mouse is positioned within GUI 200. The position 250 of the cursor 240 may be tracked responsively to its position with respect to any thumbnails of the GUI 200. For example, position 250 may be tracked only during a rendering of thumbnail 230 of the GUI 200. At a different time (when no thumbnails are displayed), no tracking of the position may occur. The position 250 includes a horizontal component 260 and a vertical component 270. The horizontal component 260 and the vertical component 270 may be measured in pixels, inches, or relative position (e.g., %ioths along the horizontal axis from the left and $\frac{1}{3}^{rd}$ along the vertical axis from the top). The computer rendering the GUI 200 utilizes the position 250 of the cursor 240 to translate the input into a second input for the first window. This second input is passed directly to the first window without passing the first input to the thumbnail 230.

In some embodiments, the computer that renders GUI 200 uses the position 250 along with the interfaces (e.g., process calls, functions) of the remote desktop software to translate the input into a second input for the first window and, consequently, further input for a server GUI (not depicted). Specifically, the remote desktop software interfaces are installed on the server and the computer that renders GUI 200 (client). The client includes one or more APIs for determining the display and position of the cursor. Through various permissions of the operating system, applications are only allowed to access a cursor's position in certain criteria (e.g., a first application may only access cursor's position when the cursor is over the first application). The permissions may be extended through a driver, a kernel extension, or add-in to also provide a cursor's position to a first application when a cursor's position is over a thumbnail corresponding to the first application. For example, part of the software stack may include a daemon that tracks the position 250 only when thumbnail 230 is displayed. The software stack does not track the position 250 of the cursor 240 when any other window or any other thumbnail is displayed. For example, in FIG. 2C upon a mouse click by the user, the position 250 is tracked by the routines of the Desktops application (installed on the client) and the daemon that is part of the remote desktop software (a kernel extension installed into the kernel of the client). This tracked position 250 indicates the portion of the thumbnail 230 corresponding to application representation 238, which corresponds to an intent to select the server application window corresponding to application representation 238.

Responsive to receiving the click of the thumbnail 230 in the client, the daemon installed in the operating system and the remote desktop software operating on the client computer determine the intent of the click was to the application representation 238. The daemon and the Desktops application cooperatively intercept the click before it is received by the operating system (preventing a focus change to the first window) and generate a second click. The second click is sent to the server and along with the software stack determine the location of the server GUI for the second click. The server changes the active focus to the server application corresponding to the application representation 238. The server then renders an updated server GUI and sends the updated server GUI to the Desktops application on the client. The Desktops application provides this updated status to the operating system of the client. On the client, the GUI 200 is still not displaying the first window, but the cursor 240 is still over the thumbnail 230. Responsively, the client re-renders the first window of the Desktop application, and the updated first window is utilized to generate a new image for thumbnail 230.

Though the examples described in FIGS. 2A, 2B, and 2C contemplate remote desktop software, other applications are also contemplated. Various other applications may utilize direct window manipulation, and those of skill would appreciate that other applications could enable application-specific CCDWM. Further, an operating system may provide the necessary functionality discussed in FIGS. 2A, 2B, and 2C without any additional extension, driver, or add-in. In detail, an operating system may include APIs that provide to any given application the position of a cursor only if the cursor is in one of three positions: 1.) over a shortcut to the given application, 2.) over a thumbnail of the given application, and 3.) the given application window. This allows for direct manipulation of the content through CCDWM in a selective manner (e.g., on an application-specific basis). Consequently, enhanced security and portability is achieved as direct window manipulation can be provided without providing cursor position to the rest of the operating system or other applications—moreover, without requiring any modification to the operating system or without providing elevated privileges.

Figure 3:
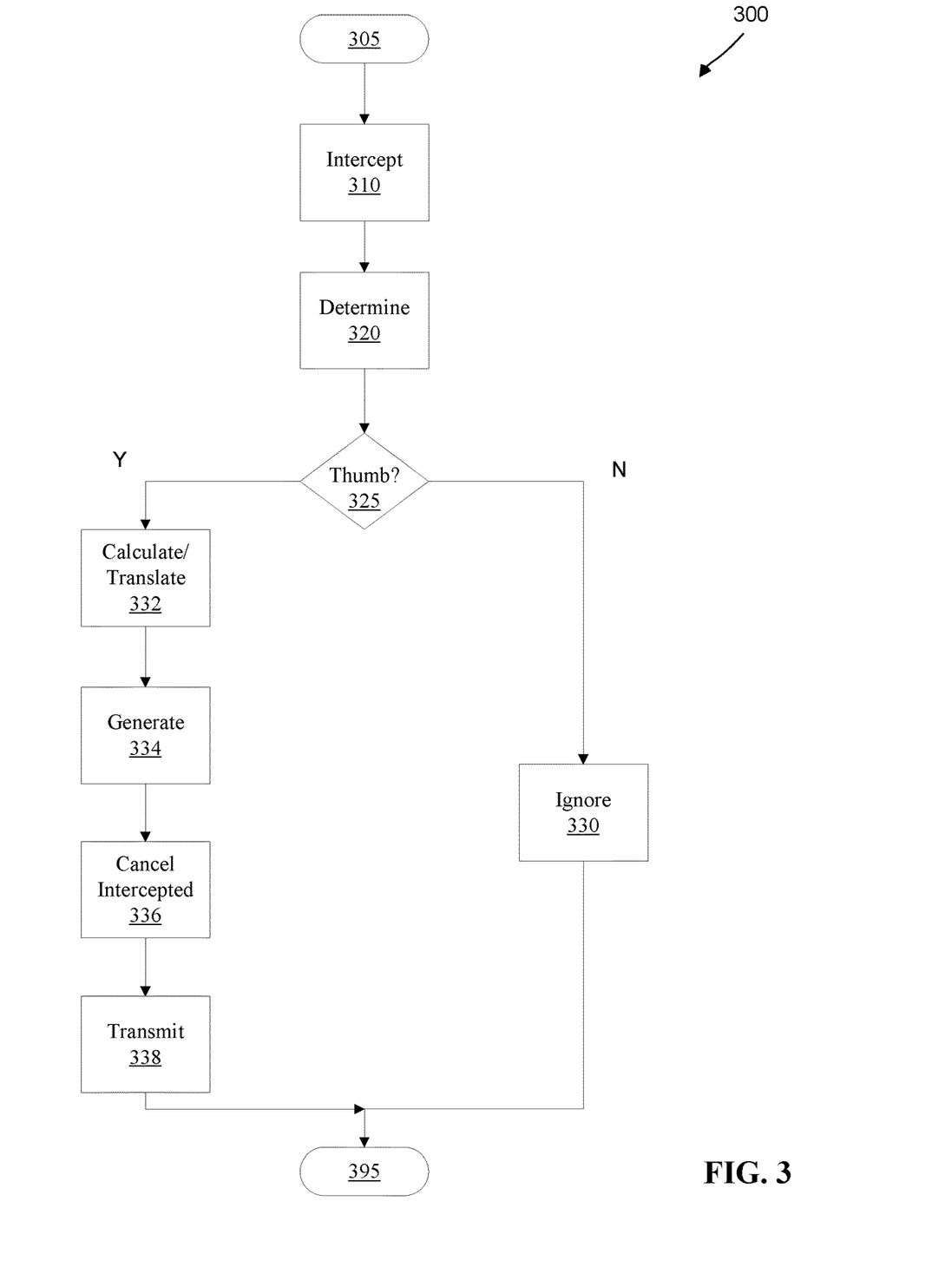
FIG. 3 depicts an example method for performing some embodiments of the disclosure.

FIG. 3 depicts an example method 300 for performing some embodiments of the disclosure. Method 300 may be performed by a computer or computer system, such as a tablet, smartphone, laptop, or other personal computer. FIG. 4 depicts a computer system 401 that may be used in some embodiments of the computer devices described herein and may be capable of performing one or more aspects of method 300. Method 300 may be performed by an operating system or hypervisor, a kernel extension or other operating system API, a device driver, a third-party utility, a single application, or some combination. Certain aspects of method 300 may be performed by multiple devices such as a first computing device and a second computing device. Method 300 may be performed continuously or periodically (e.g., every second, every 0.06 milliseconds, every fifth of a second), or it may be performed based on some other predefined trigger (user activity, hardware activity, and the like). The computer that performs method 300 may include a display device for providing a user interface (e.g., a monitor, a touchscreen, a projector).

Method 300 begins at 305 by intercepting at 310 a first interaction indication to interact with the user interface. Method 300 may begin at 305 based on a triggering event of the user interface. For example, the user interface rendering a thumbnail. The intercepting, at 310, may include intercepting a first API call, such as an operating system detecting interaction with a thumbnail. The first interaction indication, intercepted at 310, may be from an input device connected to the computer, such as a mouse, a pen input device, a trackpad, etc. The first interaction indication, intercepted at 310, may be from a combination of input devices, such as a mouse click while holding a keyboard key.

The first interaction indication, intercepted at 310, may be from a user directly interacting with a computer system, such as touching a touchscreen. The first interaction indication may be a result of a user attempting to interact with a user interface (e.g., moving a cursor over an application shortcut representative of an open application window, a click on an application window of a mouse, a touch of a thumbnail representative of an application). Intercepting, at 310, may be done passively, such as creating a copy of the first interaction indication. Intercepting, at 310, may be done directly. For example, removing the first interaction indication from an input que of an operating system. In a second example, direct interception may be done by preventing the first interaction indication from being passed from a driver or first portion of an interrupt handler.

At 320 it is determined whether an intercepted interaction indication (e.g., the first interaction indication intercepted at 310) is directed towards a thumbnail of the user interface. An intercepted interaction indication may be directed to a thumbnail if a mouse click is directed to a thumbnail (e.g., a mouse clicks while a mouse cursor is directed over a thumbnail). In some embodiments, an intercepted interaction indication is directed to a thumbnail if a mouse cursor is: directed over, graphically within the boundaries of, or otherwise visually intersecting a thumbnail.

The determination, at 320, may include performing of visual analysis, such as object detection, edge detection, or the like. For example, performing object detection to detect a cursor and edge detection to detect a thumbnail. The determination, at 320, may include performing positional recognition. For example, retrieving a horizontal and vertical position of a cursor with respect to the vertical and horizontal edges of a graphical user interface. In a second example, retrieving a horizontal and vertical position of a cursor with respect to a thumbnail of a graphical user interface. The determination, at 320, may include retrieving or requesting from an operating system the position of an intercepted interaction indication. For example, a property value, a visibility property, or API flag that indicates that a thumbnail is targeted by the intercepted interaction indication. Some combination of visual analysis, and communication with operating system may be used to make the determination, at 320. In some embodiments, the state of all windows (e.g., visibility, sizes, positions) may also be captured and determined, at 320, utilizing property values or visual analysis.

If it is determined that an intercepted interaction indication is not directed towards a thumbnail, at 325, the intercepted interaction indication is ignored at 330. Ignoring the intercepted interaction indication, at 330, may include deleting any copies of an intercepted interaction indication. Ignoring, at 330, may include permitting an intercepted interaction indication to be passed from a driver or first portion of an interrupt handler to another portion of the computing system. Ignoring, at 330, may include replacing a first interaction indication into an input que of an operating system of the computing system. Ignoring, at 330, may include restoring any application window states of the graphical user interface on the computer. For example, before intercepting an interaction indication, the states of all windows are recorded and stored. Continuing the example, at 330, the retrieved visibility properties of the windows are then used to restore the state of the windows. In some embodiments, states of windows may include the position, size, and whether a window is minimized or maximized. In some embodiments, states of windows may be determined by image analysis. After ignoring an intercepted interaction indication, at 330, method 300 ends at 395.

If it is determined that an intercepted interaction indication is directed towards a thumbnail, at 325, a position of the intercepted interaction indication is calculated at 332. The position of the interaction may be calculated, at 332, by determining the position of the interaction indication with respect to the thumbnail. Calculating the position, at 332, may include determine the horizontal and vertical position of the cursor within a thumbnail. The calculation, at 332, may be based on pixels (e.g., the number of pixels to the left or right edge of the thumbnail image, the number of pixels to the top or bottom edge of the thumbnail position). The calculation, at 332, may be based on points that are pixel independent (e.g., a display utilizing four pixels to render a point, a display utilizing nine pixels to render a point). The calculation, at 332, may be based on relative position within the thumbnail (e.g., a third of the vertical with respect to the bottom, 10 percent of the horizontal with respect to the left edge).

The calculation, at 332, also includes a translation of the intercepted interaction indication from a thumbnail position into an application position of an application window that corresponds to the thumbnail. Translation, at 332, may include determining the relative size of the thumbnail with respect to the application window. For example, a graphical user interface on the computer renders a thumbnail at "400" horizontal pixels and "300" vertical pixels. An intercepted interaction indication is at "123" horizontal pixels from the left and at "234" vertical pixels from the bottom of the thumbnail. The application window that corresponds to the render thumbnail is "800" horizontal pixels and "450" vertical pixels. Comparing the application window to the thumbnail indicates that the horizontal of the application window is scaled by a factor of "2" from the thumbnail and the vertical of the application window is scaled by a factor of "1.5" from the thumbnail.

At 334, a second interaction indication is generated. The second interaction indication, generated at 334, is with respect to the application window corresponding to the thumbnail. The generation, at 334, utilizes the calculation and translation performed at 332. Continuing the example from the previous paragraph, the scaling factor for the horizontal is used with the horizontal position of the first interaction indication. Consequently, "123" is multiplied by "2" and a horizontal pixel value of the second interaction indication is "246" pixels from the left of the application window. Likewise, the scaling factor for the vertical is used with the vertical position of the first interaction indication. Consequently, "234" is multiplied by "1.5" and a vertical pixel value of the second interaction indication is "351" pixels from the bottom of the application window. In some embodiments, calculation and translation, at 332, and/or generation, at 334, may include rounding any result values due to translation and generation.

At 336 an intercepted interaction indication is canceled. Canceling, at 336, may include performing any cleanup on the intercepted interaction indication. Canceling, at 336, may include permanently removing the intercepted interaction indication from any input que of a device driver, operating system memory assigned to handling input. Canceling, at 336, may include recording the intercepted interaction indication for diagnostics. Consequently, canceling at 336 may prevent any direct interaction by an input device with a thumbnail (e.g., not allowing any mouse clicks, preventing focus changes, maintaining state of the windows rendered by the computer).

At 338 the second interaction indication, generated at 334, is directly transmitted to the application window of the user interface. Transmission, at 338, may include restoring the state of the graphical user interface rendered by the computer. In detail, some applications within a graphical user interface change focus or state upon receiving direct input (e.g., requesting focus, maximizing view). The state of all the application windows such as their size and visibility, may be used to restore the visibility of the applications to a state before the second interaction indication was transmitted. For example, a writing application may display a second dialog window within the first window and upon receiving input to the second dialog window may ask for and request focus from the operating system. The operating system may, responsive, attempt to change focus from a first window to the writing application. After transmission of the second interaction, at 338, state information, recorded before or at 310, is used to override visibility properties before a rendering and rasterizing component of the operating system retrieves the properties. Finalizing the example, upon retrieval by the operating system renderer, the updated state values ensure that the after the application is directly updated by the second interaction indication, the pre-state is retained. After transmission of the second interaction indication, at 338, method 300 ends at 395.

FIG. 4 depicts the representative major components of an example computer system 401 that may be used, in accordance with embodiments of the present disclosure. It is appreciated that individual components may vary in complexity, number, type, and\or configuration. The particular examples disclosed are for example purposes only and are not necessarily the only such variations. The computer system 401 may comprise a processor 410, memory 420, an input/output interface (herein I/O or 110 interface) 430, and a main bus 440. The main bus 440 may provide communication pathways for the other components of the computer system 401. In some embodiments, the main bus 440 may connect to other components such as a specialized digital signal processor (not depicted).

The processor 410 of the computer system 401 may be comprised of one or more cores 412A, 412B, 412C, 412D (collectively 412). The processor 410 may additionally include one or more memory buffers or caches (not depicted) that provide temporary storage of instructions and data for the cores 412. The cores 412 may perform instructions on input provided from the caches or from the memory 420 and output the result to caches or the memory. The cores 412 may be comprised of one or more circuits configured to perform one or methods consistent with some embodiments of the present disclosure. In some embodiments, the computer system 401 may contain multiple processors 410. In some embodiments, the computer system 401 may be a single processor 410 with a singular core 412.

The memory 420 of the computer system 401 may include a memory controller 422. In some embodiments, the memory 420 may comprise a random-access semiconductor memory, storage device, or storage medium (either volatile or non-volatile) for storing data and programs. In some embodiments, the memory may be in the form of modules (e.g., dual in-line memory modules). The memory controller 422 may communicate with the processor 410, facilitating storage and retrieval of information in the memory 420. The memory controller 422 may communicate with the I/O interface 430, facilitating storage and retrieval of input or output in the memory 420.

The I/O interface 430 may comprise an I/O bus 450, a terminal interface 452, a storage interface 454, an I/O device interface 65, and a network interface 458. The I/O interface 430 may connect the main bus 440 to the I/O bus 450. The I/O interface 430 may direct instructions and data from the processor 410 and memory 420 to the various interfaces of the I/O bus 450. The I/O interface 430 may also direct instructions and data from the various interfaces of the I/O bus 450 to the processor 410 and memory 420. The various interfaces may include the terminal interface 452, the storage interface 454, the I/O device interface 456, and the network interface 458. In some embodiments, the various interfaces may include a subset of the aforementioned interfaces (e.g., an embedded computer system in an industrial application may not include the terminal interface 452 and the storage interface 454).

Logic modules throughout the computer system 401—including but not limited to the memory 420, the processor 410, and the I/O interface 430—may communicate failures and changes to one or more components to a hypervisor or operating system (not depicted). The hypervisor or the operating system may allocate the various resources available in the computer system 401 and track the location of data in memory 420 and of processes assigned to various cores 412. In embodiments that combine or rearrange elements, aspects and capabilities of the logic modules may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   intercepting, from a user interface, a first transmission of a first interaction indication to interact with a first portion of the user interface, the user interface currently displaying a thumbnail representative of an associated application window, wherein the associated application window is represented by the thumbnail;
   determining, from the user interface, the first interaction indication is directed towards the thumbnail representative of the associated application window;
   canceling the first transmission of the first interaction indication to the user interface;

calculating, based on a position of the first interaction indication before cancelation, a thumbnail position of the first interaction indication;

translating the calculated thumbnail position of the first interaction indication to an application position of the associated application window;

generating, based on the calculated thumbnail position, and based on the first interaction indication, a second interaction indication, the second interaction indication directed towards the application position of the associated application window; and transmitting the second interaction indication to the user interface such that the user interface directly interacts with the associated application window.

2. The method of claim 1, wherein the translating comprises:

performing a calculation of the horizontal position and the vertical position of the first interaction indication; and performing a comparison between the thumbnail and the associated application window.

3. The method of claim 1, wherein the associated application window includes a visibility property, the visibility property controlling the display state of the associated application window in the user interface, wherein the method further comprises:

retrieving, before the transmitting the second interaction indication, the visibility property of the associated application window; and restoring, based on the visibility property, the associated application window to a first display state, the first display state prior to transmitting the second interaction indication to the user interface.

4. The method of claim 1, wherein the method further comprises:

analyzing, before the transmitting the second interaction indication, the state of the user interface including the associated application window;

determining, based on the analysis, the display state of the associated application window; and restoring, based on the determined display state, the associated application window to a first display state, the first display state prior to transmitting the second interaction indication to the user interface.

5. The method of claim 4, wherein the display state of the associated application window is the associated application window is minimized.

6. The method of claim 1, wherein the user interface includes an application window of a second computer system, the second computer system operating from a remote desktop session, and wherein the method is performed by a first computer system.

7. The method of claim 1, wherein the transmission of the second interaction indication is received by the associated application window, wherein the method further comprises:

performing, by an application corresponding to the associated application window and in response to the received second interaction indication, an application operation, wherein the application operation is performed directly by the application and without any operations of the thumbnail representative of the associated application window.

8. The method of claim 1, wherein the associated application window is a remote desktop connection window of a remote desktop application, and wherein the one or more operations of the method are performed by the remote desktop application.

9. A system comprising:

a memory for storing one or more instruction; and a processor, the processor communicatively coupled to the memory, the processor, in response to the one or more instructions, configured to:

intercept, from a user interface, a first transmission of a first interaction indication to interact with a first portion of the user interface, the user interface currently displaying a thumbnail representative of an associated application window, wherein the associated application window is represented by the thumbnail;

determine, from the user interface, the first interaction indication is directed towards the thumbnail representative of the associated application window;

cancel the first transmission of the first interaction indication to the user interface;

calculate, based on a position of the first interaction indication before cancelation, a thumbnail position of the first interaction indication;

translate the calculated thumbnail position of the first interaction indication to an application position of the associated application window;

generate, based on the calculated thumbnail position, and based on the first interaction indication, a second interaction indication, the second interaction indication directed towards the application position of the associated application window; and transmit the second interaction indication to the user interface such that the user interface directly interacts with the associated application window.

10. The system of claim 9, wherein the translating includes performing a calculation of the horizontal position and the vertical position of the first interaction indication and further includes performing a comparison between the thumbnail and the associated application window.

11. The system of claim 9, wherein the associated application window includes a visibility property, the visibility property controlling the display state of the associated application window in the user interface, wherein the processor is further configured to:

retrieve, before the transmitting the second interaction indication, the visibility property of the associated application window; and restore, based on the visibility property, the associated application window to a first display state, the first display state prior to transmitting the second interaction indication to the user interface.

12. The system of claim 9, wherein the processor is further configured to:

analyze, before the transmitting the second interaction indication, the state of the user interface including the associated application window;

determine, based on the analysis, the display state of the associated application window; and restore, based on the determined display state, the associated application window to a first display state, the first display state prior to transmitting the second interaction indication to the user interface.

13. The system of claim 12, wherein the display state of the associated application window is the associated application window is minimized.

14. The system of claim 9, wherein the user interface includes an application window of a second computer system, the second computer system operating from a remote desktop session.

15. The system of claim 9, wherein the transmission of the second interaction indication is received by the associated application window, wherein the processor is further configured to:
  perform, by an application corresponding to the associated application window and in response to the received second interaction indication, an application operation, wherein the application operation is performed directly by the application and without any operations of the thumbnail representative of the associated application window.

16. The system of claim 9, wherein the associated application window is a remote desktop connection window of a remote desktop application, and wherein the one or more instructions are by the remote desktop application.

17. A computer program product, the computer program product comprising a computer readable storage medium having program instructions embodied therewith, the program instructions configured to:
  intercept, from a user interface, a first transmission of a first interaction indication to interact with a first portion of the user interface, the user interface currently displaying a thumbnail representative of an associated application window, wherein the associated application window is represented by the thumbnail;
  determine, from the user interface, the first interaction indication is directed towards the thumbnail representative of the associated application window;
  cancel the first transmission of the first interaction indication to the user interface;
  calculate, based on a position of the first interaction indication before cancelation, a thumbnail position of the first interaction indication;
  translate the calculated thumbnail position of the first interaction indication to an application position of the associated application window;
  generate, based on the calculated thumbnail position, and based on the first interaction indication, a second interaction indication, the second interaction indication directed towards the application position of the associated application window; and
  transmit the second interaction indication to the user interface such that the user interface directly interacts with the associated application window.

18. The computer program product of claim 17, wherein the associated application window includes a visibility property, the visibility property controlling the display state of the associated application window in the user interface, wherein the program instructions are further configured to:
  retrieve, before the transmitting the second interaction indication, the visibility property of the associated application window; and
  restore, based on the visibility property, the associated application window to a first display state, the first display state prior to transmitting the second interaction indication to the user interface.

19. The computer program product of claim 17, wherein the program instructions are further configured to:
  analyze, before the transmitting the second interaction indication, the state of the user interface including the associated application window;
  determine, based on the analysis, the display state of the associated application window;
  restore, based on the determined display state, the associated application window to a first display state, the first display state prior to transmitting the second interaction indication to the user interface.

20. The computer program product of claim 19, wherein the display state of the associated application window is the associated application window is minimized.

* * * * *